(12) United States Patent
Karadag

(10) Patent No.: US 10,229,614 B2
(45) Date of Patent: Mar. 12, 2019

(54) MATHEMATICS AND GEOMETRY DEVICE FOR VISUALLY IMPAIRED

(71) Applicant: Oguz Karadag, Istanbul (TR)

(72) Inventor: Oguz Karadag, Istanbul (TR)

( * ) Notice: Subject to any disclaimer, the term of this patent is extended or adjusted under 35 U.S.C. 154(b) by 196 days.

(21) Appl. No.: 15/026,992

(22) PCT Filed: Oct. 2, 2014

(86) PCT No.: PCT/TR2014/000355
§ 371 (c)(1),
(2) Date: Apr. 4, 2016

(87) PCT Pub. No.: WO2015/050517
PCT Pub. Date: Apr. 9, 2015

(65) Prior Publication Data
US 2016/0260354 A1    Sep. 8, 2016

(30) Foreign Application Priority Data

Oct. 3, 2013   (TR) .................................. 2013/11628

(51) Int. Cl.
*G09B 23/02* (2006.01)
*G09B 23/04* (2006.01)
*G09B 21/00* (2006.01)
*G09B 21/02* (2006.01)
*G09B 19/02* (2006.01)

(52) U.S. Cl.
CPC ............. *G09B 23/04* (2013.01); *G09B 19/02* (2013.01); *G09B 21/004* (2013.01); *G09B 21/02* (2013.01)

(58) Field of Classification Search
USPC ......... 434/112, 113, 115, 188, 191, 200, 202
See application file for complete search history.

(56) References Cited

U.S. PATENT DOCUMENTS

| 4,871,992 A * | 10/1989 | Petersen | G09B 21/003 340/4.12 |
| 6,417,821 B1 * | 7/2002 | Becker | G09B 21/003 340/407.1 |
| 6,542,623 B1 * | 4/2003 | Kahn | G09B 21/003 382/114 |
| 6,705,868 B1 * | 3/2004 | Schleppenbach | G09B 21/004 434/112 |

(Continued)

FOREIGN PATENT DOCUMENTS

| EP | 0169959 A1 | 2/1986 |
| FR | 2862797 A1 | 5/2005 |

(Continued)

*Primary Examiner* — Kurt Fernstrom
(74) *Attorney, Agent, or Firm* — Gokalp Bayramoglu

(57) ABSTRACT

The present invention relates to a mathematics and geometry device for visually impaired (1) comprising retractable push-buttons (2) at least one button body (4) which enable the push-button to be placed on the socket (3) and making a linear movement towards the inside-outside of the device when the push-buttons are pressed; and at least one lock system which is located on the button body and which enables the button body to be locked in upper and lower positions; when the button body is locked in the upper position, the push-button becomes an open button; when the button body is locked in the lower position, the push-button becomes a closed button.

8 Claims, 2 Drawing Sheets

(56) References Cited

U.S. PATENT DOCUMENTS

| | | | | |
|---|---|---|---|---|
| 6,743,021 | B2 * | 6/2004 | Prince | G09B 21/003 |
| | | | | 434/112 |
| 7,367,806 | B1 * | 5/2008 | Murphy | G09B 21/004 |
| | | | | 434/112 |
| 7,706,509 | B2 * | 4/2010 | Salpietra | G09B 21/003 |
| | | | | 379/52 |
| 8,690,576 | B2 * | 4/2014 | Murphy | G09B 21/003 |
| | | | | 434/114 |

FOREIGN PATENT DOCUMENTS

| | | | | |
|---|---|---|---|---|
| WO | WO2004047050 | A1 | 6/2004 | |
| WO | WO 2005/039882 | * | 5/2005 | B41J 3/32 |
| WO | WO2005039882 | A2 | 5/2005 | |
| WO | WO2012028157 | | 3/2012 | |

* cited by examiner

MATHEMATICS AND GEOMETRY DEVICE FOR VISUALLY IMPAIRED

FIELD OF THE INVENTION

The present invention relates to a mechanism which provides facility in education, particularly mathematics and geometry education for visually impaired.

BACKGROUND OF THE INVENTION

The letters of the alphabet, numbers and symbols, which are represented by raised dots for the visually impaired to be able to read and write mathematical operations, are indicated with blocks consisting of six dots arranged in a rectangular arrangement comprising two columns of three dots each. The characters are differed from each other depending on the number and position of the raised dots at each block. In mechanisms used for the characters compatible with this method, embossments are made on a flat paper whereby letters, numbers or symbols are written and read.

In these mechanisms, even solving the simplest equations with two unknowns requires performing many steps. For example; these steps are as follows in order: printing the question on the paper and removing the printed paper from the mechanism and reading it, rearranging the read paper into the mechanism and calculating the first unknown mentally, printing the first unknown on the paper, removing the paper from the mechanism and reviewing the operations again, printing the value calculated for the first unknown to the concerned places in the equation, removing the paper again from the mechanism and upon reading the operations calculating the second unknown mentally, printing the second unknown on the paper and calculating the result, removing the paper, where the calculated result is printed, from the mechanism and checking accuracy thereof.

When mathematical operations are being performed by visually impaired, the fact that there are too many steps both takes too much time and causes difficulties in use. Again similarly, visually impaired experience difficulties resembling the above given example in vertical mathematical operations, continued fractions and nested square root operations. These are relatively easy and basic topics in mathematics. In the current conditions, opportunities of a visually impaired person to make advanced mathematical operations such as "derivatives, integrals, limits, proofs" is extremely restricted and thus there is a negative situation of failure of the visually impaired to learn or failure to teach the visually impaired a basic science such as mathematics at a desired level. "Mathematics and geometry device for visually impaired" will, by means of the mechanical system that is developed, enable the visually impaired to correct their mistakes in their operations, revise the operation and place the values they calculate within the operation and thereby save them from the burden of additional operations. In other words, after obtaining the numerical value of the "X" unknown, it will be possible to insert the obtained numerical value in place of the "X" unknown in the equation. The device also serves as a scribble paper. For example, a number mistake made in the operation and a calculation error can be corrected immediately by means of the buttons on the mechanism. Additionally, since the system is comprised of a plurality of lines, simple mathematical operations can be made in the unoccupied parts of the panel and can be applied in the actual operation. This will help reduce time loss which is one of the biggest handicaps for visually impaired during the operations. Currently, the visually impaired should follow the process steps similar to the above given example of "an equation with two unknowns" in all kinds of mathematical problems.

The European patent document no. EP0169959A1 an application known in the state of the art, discloses a Braille print board. In this board, sextet balls which are bulging on the board can be pressed in by a Braille pen and can be raised back when desired. This way it can be used over and over again. After the balls are pressed in by the pen, the balls which protrude from the other surface form embosses on the paper. There is one protective surface between the balls and the paper. This surface prevents the balls from falling from the cells when they are pushed. Additionally, since the letters and the numbers are formed by protrusion of the balls from the other surface, the same writing can be printed on a new piece of paper. This is a kind of mechanical Braille photocopy device. However, when mathematical operations are desired to be made in this device, the paper should be removed from the mechanism over and over again in order to follow each step and since the writing is printed on the paper, no changes can be made on the same paper. In any case, this device does not involve the present field in terms of its function and purpose.

The International patent document no. WO2012028157, an application known in the state of the art, discloses a Braille panel for performing arithmetic mathematical operations. In the said invention, when the numbers, which have been made into keys, are pressed; numbers are raised in the middle region and calculations can be made with it just like a kind of calculator. However there is no explanation in the said invention regarding making corrections similar to the functions provided in the "Mathematics and Geometry Device for Visually Impaired". The "Mathematics and Geometry Device for Visually Impaired" is configured to facilitate not only arithmetic operations but all kinds of mathematical and geometrical operations.

SUMMARY OF THE INVENTION

An objective of the present invention is to provide a mathematics and geometry device for visually impaired wherein, when the buttons in the form of hemisphere, cube, rectangular prism, etc. are pressed, the buttons cave in, and when the caved (depressed) buttons are pressed again they return to their original positions.

Another objective of the present invention is to provide a mathematics and geometry device for visually impaired which produces letters, numbers and symbols when the buttons in the form of hemisphere, cube, rectangular prism, etc. are pressed.

A further objective of the present invention is to provide a mathematics and geometry device for visually impaired wherein one or more buttons selected from the buttons provided in the mechanism enable control of all or some of the other buttons provided in the mechanism.

Another objective of the present invention is to provide a mathematics and geometry device for visually impaired which detects the position of the depressed (caved in) buttons by the help of a computer program and which can transform it to a writing that can be read by people who do not know the alphabet for visually impaired and who are not visually impaired.

A further objective of the present invention is to provide a system which enables to save the figures drawn and the operations made on the device in an external or internal memory simultaneously via a computer program and enables to project them on a display screen provided therein or any computer monitor; and similarly a mathematics and geometry device for visually impaired which allows to save a geometric or any other figure that is available in an electronic medium into the device memory and enables this figure to be touched and processed.

Another objective of the present invention is to provide a mathematics and geometry device for visually impaired which enables to save data to the desired region on the mechanism, as a text, number or symbol, to make changes in the saved data, and thus to control each operation step when desired.

A further objective of the present invention is to provide a mathematics and geometry device for visually impaired which enables to obtain embossments of the geometric figures on the mechanism by applying force on the buttons that are arranged in a depressed form in equal spaces to each other by means of a pen, rod or a similar instrument; and which prevents the visually impaired from being exempt from geometry field by obtaining mathematical symbols and numbers upon exerting vertical force on the depressed buttons.

Another objective of the present invention is to provide a mathematics and geometry device for visually impaired which enables the buttons provided on the mechanism to be depressed and retracted by means of exerting a small amount of force.

BRIEF DESCRIPTION OF THE DRAWINGS

A mathematics and geometry device for visually impaired developed to fulfill the objective of the present invention is illustrated in the accompanying figures, in which.

Figure 1:
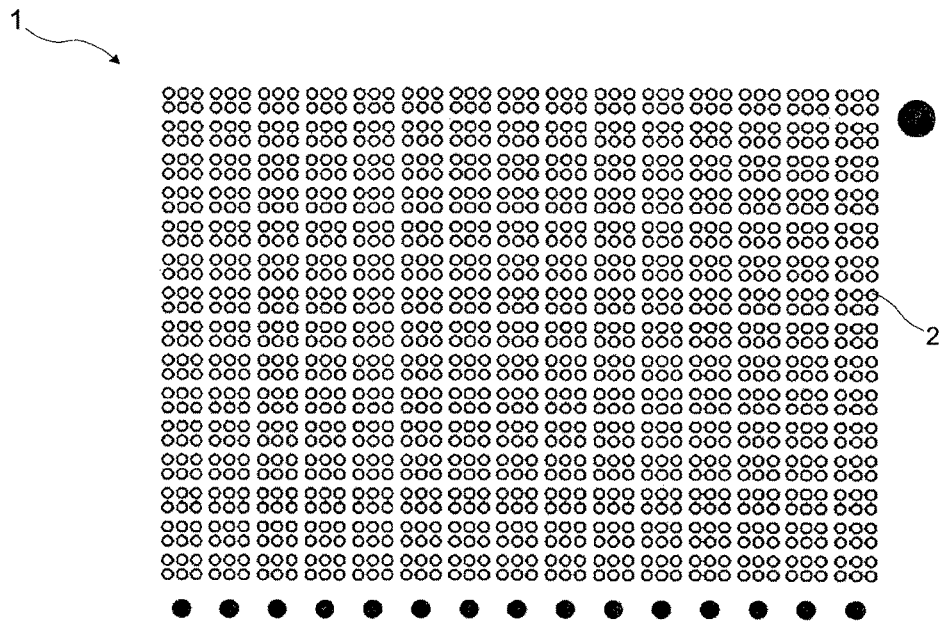
FIG. 1 is a sectional view of the mathematics and geometry device for visually impaired.
Figure 2:
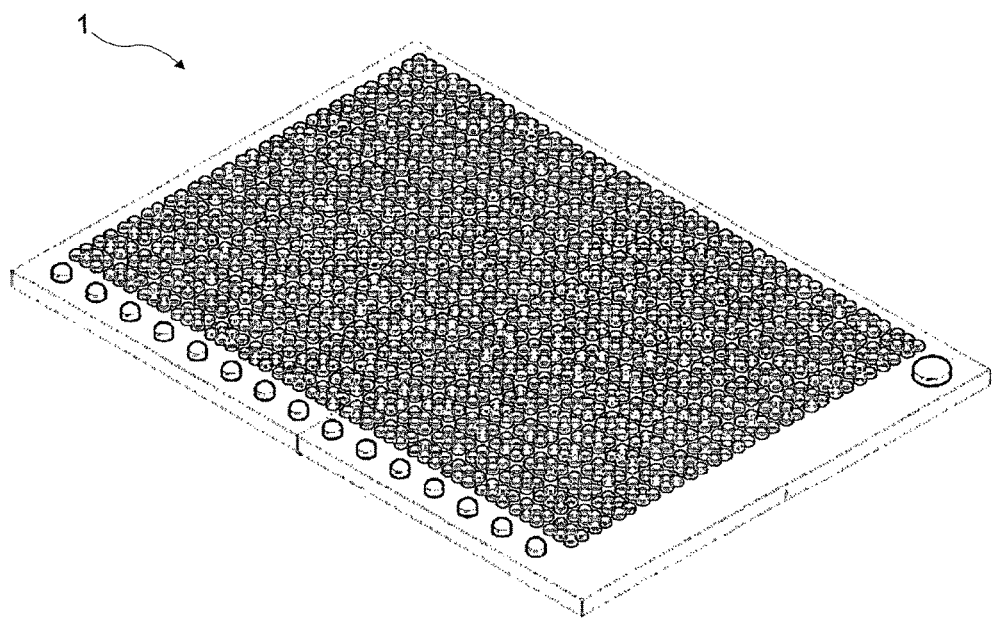
FIG. 2 is a perspective view of the mathematics and geometry device for visually impaired.

The components shown in the figures are given reference numbers as follows:
1. Mathematics and geometry device
2. Retractable push-button
3. Socket
4. Button body

DETAILED DESCRIPTION OF THE INVENTION

Figure 3:
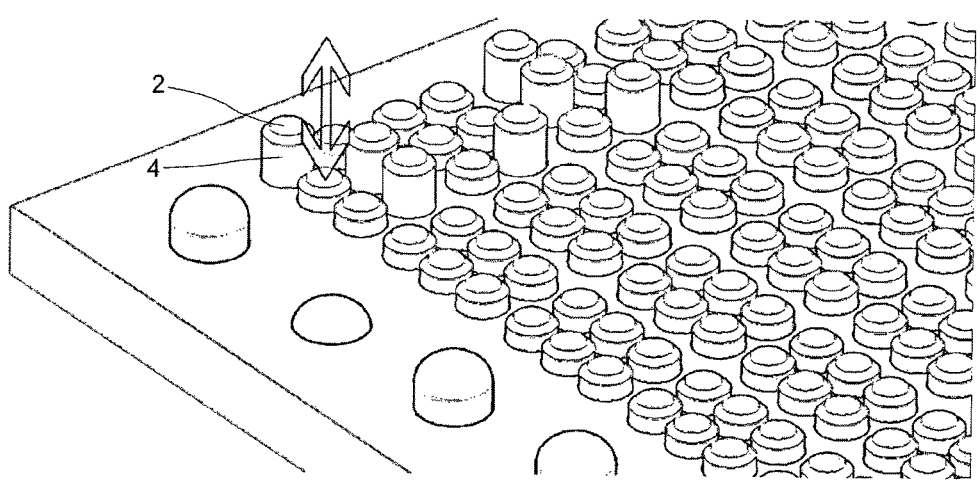
FIG. 3 is a perspective view of the mathematics and geometry device for visually impaired.
Figure 4:
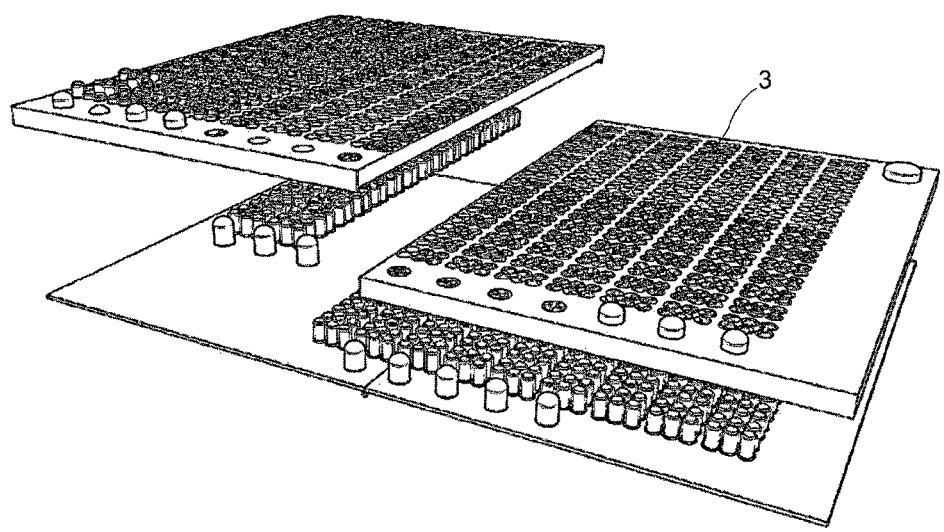
FIG. 4 is an exploded perspective view of the mathematics and geometry device for visually impaired.

A mathematics and geometry device for visually impaired (1); which enables mathematical and geometrical operations to be made more practically by visually impaired, and wherein different symbols are indicated according to the number and position of the dots, and which can be converted to a writing that can be read by people who do not know the alphabet for visually impaired and who are not visually impaired; basically comprises retractable push-buttons (2), which are provided in blocks consisting of six elements arranged in a rectangular arrangement comprising two columns of three elements each on a plane, and which are in the form of a hemisphere, cube, rectangular prism, etc.;

at least one socket (3) which enables the retractable push-buttons (2) to be placed on the device;

at least one button body (4) which is placed on the socket (3) and which makes a linear movement towards the inside-outside of the device when pressed;

at least one lock system (not shown in the figures) which is located on the button body (4) and which enables the button body (4) to be locked in forward and backward positions;

open button which is defined by locking of the button body (4) in upper position (FIG. 3);

closed button which is defined by locking of the button body (4) in lower position (FIG. 3).

The other elements are placed on the socket (3), in which the retractable push-button (2) is located and which enables connection to the device. The said socket (3) is preferably made of a plastic, metal and similar material.

The button body (4), which is located on the retractable push-button (2), is placed into the socket (3). When it is pressed thereon, the button body (4) linearly moves inwards or outwards of the device forward or backward.

In the preferred embodiment of the invention, the retractable push-button (2) is in the form of a hemisphere, cube, rectangular prism, and similar shapes. The retractable push-button (2) is made of a resilient material and can stretch or contract when force is applied thereon. The retractable push-button (2) is produced by using at least one material from the group of resilient and bendable leather, metal and plastic materials or a combination of at least two materials from the group.

In the preferred embodiment of the invention the button body (4) enables to transmit the force applied on the button (2). The button body (4) is produced by using at least one material from the group of resilient and bendable metal and plastic materials or a combination of at least two materials from the group.

In the preferred embodiment of the invention, the open button is in the form of a hemisphere, cube, rectangular prism, and similar shapes. The open button is made of a resilient material and can stretch or contract when a vertical force is applied thereon by the help of a pen, rod, finger, etc. The open button contracts and becomes a closed button when a vertical force is applied thereon. The open button is produced by using at least one material from the group of resilient and bendable leather, metal and plastic materials or a combination of at least two materials from the group.

In the preferred embodiment of the invention, the closed button is in the form of a hemisphere, cube, rectangular prism, and similar shapes. The closed button is made of a resilient material and can stretch or contract when a vertical force is applied thereon by the help of a pen, rod, finger, etc. The closed button stretches and becomes an open button when a vertical force is applied thereon. The closed button is produced by using at least one material from the group of resilient and bendable leather, metal and plastic materials or a combination of at least two materials from the group.

In a preferred embodiment of the invention, when all of the retractable push-buttons (2) on the mechanism are open or closed, vertical force is applied on the retractable push-buttons (2) by the help of a finger, a special design pen or rod and the retractable push-buttons (2) become open or closed buttons on the mechanism. Geometric figures can be formed by open or closed buttons prepared in a certain arrangement, and mathematical numbers and symbols can be obtained by using the same buttons. This way, the visually impaired people who had been exempt from the geometrical operations will be able to make these operations.

In another preferred electronic embodiment of the invention, a system is considered, which enables to save the figures drawn and the operations made on the device in an external or internal memory simultaneously, and enables to project them on a display screen provided therein or any computer monitor. And similarly, a geometric or any other figures that is available in an electronic medium can be saved to the device memory and this saved figure will become available to touched and processed.

In a preferred electronic embodiment of the invention, a system is used which enables to project the information printed by retractable push-buttons (2) by means of an electronic program on a display screen as a normal writing and to save it to the memory of the device or to an external memory. In the mechanical version of this system, if changes are made in the data, it can not be recorded which change is made at which operation step. The electronic version of the system provides this opportunity and saves each operation step that is desired to the memory. It enables to control any operation step, make crosschecks, and make the operations permanent when preferred. By means of the same version, Braille normal writing printout of the saved data can be obtained. This way, in inclusive education, convenience of instant feedback can be possible. The device can operate in harmony with the smart boards in schools and it is possible to project the operations on the board.

Within the framework of this basic concept, it is possible to develop various embodiments of the mathematics and geometry tool for visually impaired (1) of the present invention. The invention cannot be limited to the examples described herein and it is essentially as defined in the claims.

The invention claimed is:

1. A mathematics and geometry device for visually impaired comprising:
   a plurality of retractable push-buttons, wherein the plurality of retractable push-buttons are provided in blocks consisting of a plurality of elements arranged in a rectangular arrangement comprising a plurality of columns, and the plurality of elements are in the form of a hemisphere, a cube, or a rectangular prism;
   a plurality of sockets for enabling the plurality of retractable push-buttons to be placed thereon, in an arrangement that a socket in the plurality of sockets corresponds to a retractable push-button in the plurality of push-buttons;
   at least one button is placed on the socket and the at least one button makes a linear movement within the socket when pressed;
   at least one lock system located on the button and the at least one lock system enables the button body to be locked in an upper and a lower position;
   wherein each button is corresponding to a dot and different symbols are indicated according to the number and position of the dots;
   wherein the retractable push-buttons are arranged in equal spaces to each other.

2. The mathematics and geometry device for visually impaired of claim 1, wherein the push-button comes to an open or a closed position when the button body moves downwards or upwards by means of a vertical force applied on the button body.

3. The mathematics and geometry device for visually impaired of claim 1, wherein the push-button is produced by using at least one material from the group of resilient and bendable bamboo, leather, metal and plastic materials or a combination of at least two materials from the group.

4. The mathematics and geometry device for visually impaired of claim 1, wherein the open button is formed when the button body that is connected to the push-button stretches into released state when a vertical force is applied to the closed button.

5. The mathematics and geometry device for visually impaired of claim 4, wherein the closed button which is formed when the button body that is connected to the button contracts into compressed state when a vertical force is applied to the open button.

6. The mathematics and geometry device for visually impaired of claim 1, wherein the retractable push-buttons are configured to obtain embossments of geometric figures on the device by applying force on the closed buttons by means of a pen or a rod; and to obtain mathematical symbols and numbers by applying vertical force on the closed buttons.

7. The mathematics and geometry device for visually impaired of claim 1, wherein one or more buttons selected from the buttons provided in the mechanism enable control of all or some of the other buttons provided in the mechanism.

8. A mathematics and geometry device for visually impaired comprising:
   a plurality of retractable push-buttons, wherein the plurality of retractable push-buttons are provided in blocks consisting of a plurality of elements arranged in a rectangular arrangement comprising a plurality of columns, and are in the form of a hemisphere, a cube, or a rectangular prism;
   at least one socket which enables the plurality of retractable push-buttons to be placed thereon;
   at least one button body placed on the socket and the at least one button body makes a linear movement towards the inside—outside of the socket when pressed;
   at least one lock system located on the button body and the at least one lock system enables the button body to be locked in upper and lower positions; when the button body is locked in the upper position, the push-button becomes an open button; when the button body is locked in the lower position, the push-button becomes a closed button;
   an electronic program for recording and saving information printed by the retractable push-buttons in a memory;
   wherein the electronic program records and saves each operation step in the memory; and
   the electronic program is configured to display the information on a display screen wherein one or more buttons selected from the buttons provided in the mechanism enable control of all or some of the other buttons provided in the mechanism.

* * * * *